United States Patent [19]

Arai

[11] 4,443,121

[45] Apr. 17, 1984

[54] THERMAL PRINTING APPARATUS WITH REFERENCE GRAY SCALE COMPARATOR

[75] Inventor: Kiyoshi Arai, Higashikurume, Japan

[73] Assignee: Sony Corporation, Tokyo, Japan

[21] Appl. No.: 470,964

[22] Filed: Mar. 1, 1983

[30] Foreign Application Priority Data

Mar. 2, 1982 [JP] Japan .................................. 57-31709

[51] Int. Cl.³ ........................ B41J 3/02; G01D 15/10; H04N 7/12
[52] U.S. Cl. ............................... 400/120; 346/76 PH; 358/256
[58] Field of Search .................... 400/120; 346/76 PH; 219/216 PH; 358/75, 256, 298, 299, 283

[56] References Cited

U.S. PATENT DOCUMENTS

| | | |
|---|---|---|
| 3,934,695 | 1/1976 | Kovalick . |
| 4,071,849 | 1/1978 | Koyano et al. . |
| 4,110,795 | 8/1978 | Spencer .......................... 358/256 X |
| 4,158,203 | 6/1979 | Johnson, Jr. ................... 346/76 PH |
| 4,162,131 | 7/1979 | Carson, Jr. et al. . |
| 4,168,421 | 9/1979 | Ito . |
| 4,219,824 | 8/1980 | Asai . |
| 4,268,838 | 5/1981 | Nakano et al. . |
| 4,280,404 | 7/1981 | Barrus et al. . |
| 4,319,267 | 3/1982 | Mitsuya et al. ....................... 358/75 |
| 4,335,968 | 6/1982 | Regnault .............................. 400/120 |
| 4,378,566 | 3/1983 | Tsukamura ..................... 346/76 PH |
| 4,409,600 | 10/1983 | Minowa ......................... 346/76 PH |

FOREIGN PATENT DOCUMENTS

| | | |
|---|---|---|
| 5034 | 10/1979 | European Pat. Off. . |
| 1504231 | 3/1978 | United Kingdom . |
| 1528377 | 10/1978 | United Kingdom . |

Primary Examiner—E. H. Eickholt
Attorney, Agent, or Firm—Lewis H. Eslinger; Alvin Sinderbrand

[57] ABSTRACT

A thermal transfer printing head for printing gray scale television frame images is driven by pulse width modulated signals derived without the use of comparators by employing a read only memory in which pulse width modulation data has been stored. The read only memory is addressed by the data signals and a reference gray scale counter to produce pulsed output signals fed to a random access memory. The random access memory is then read out by addressing it with addresses corresponding to gray scale reference signals and cyclical addresses produced by an address counter. The random access memory output signals, representing the pulse width modulated image data, is converted to parallel signals fed to a latch and driver circuit for energizing the individual heat elements of the thermal printing head.

16 Claims, 9 Drawing Figures

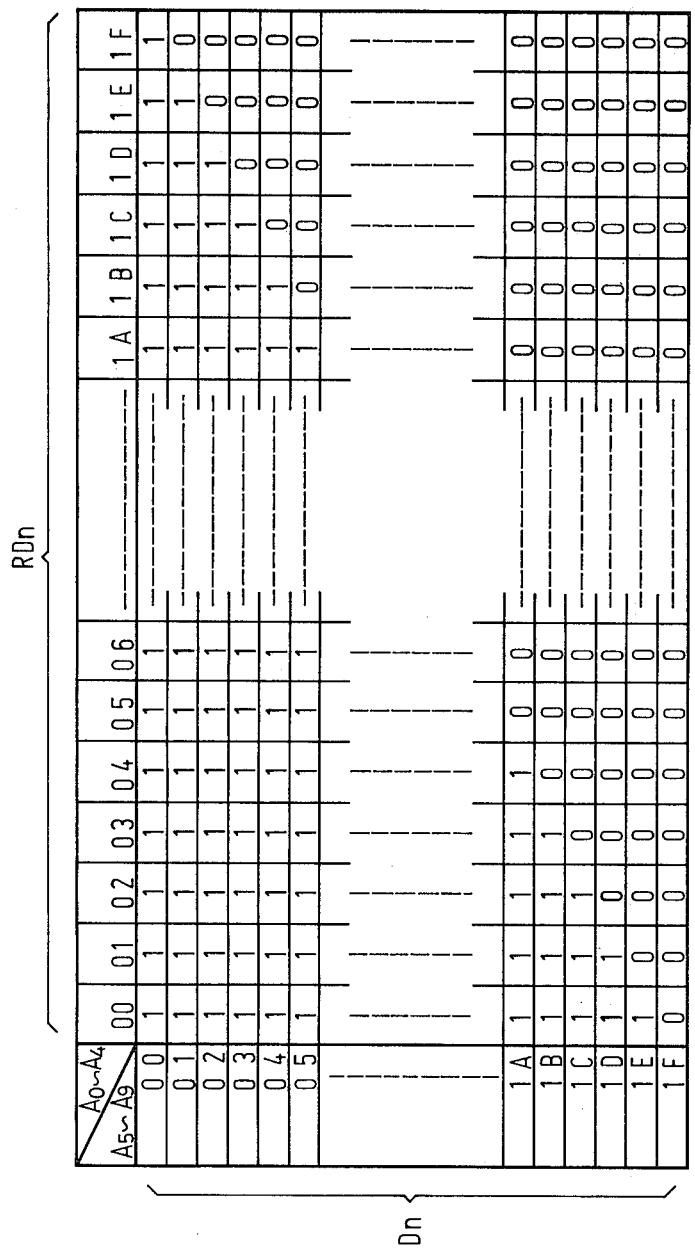

THERMAL PRINTING APPARATUS WITH REFERENCE GRAY SCALE COMPARATOR

BACKGROUND OF THE INVENTION

1. Field of the Invention

The present invention relates generally to thermal printing apparatus for printing gray scale images and, more particularly, relates to apparatus for producing gray scale image signals to be fed to a thermal printer to produce a printed copy of a still image, as represented by one frame of a television signal.

2. Description of Prior Art

It is known, according to the prior art, to produce a printed copy of a frame of a television signal based on the gray scale levels of the television frame using an electrically energizable thermal head. The various gray scale levels in the frame are obtained by varying the period of time during which the several elements of the thermal head are energized, the period of energization being proportional to the detected gray scale levels of the elements of the television frame.

For example, and referring to FIG. 1, when producing a printed copy of an image on television screen S, the video signal corresponding to the picture elements of the image on the television screen are scanned or examined sequentially. Such scanning is vertically in the downward direction, as indicated by arrows A and B, in order to sample or measure the gray scale level of each of the picture elements $d_{1,1}$ to $d_{256,1}$ in the case of line A and $d_{1,2}$ to $d_{256,2}$ in the case of line B. All of the subsequent remaining vertical lines of the frame are scanned in a similar fashion. To obtain values corresponding to the gray scale levels, the levels corresponding to the various sample points are converted to pulse width modulation (PWM) signals, and are used to drive a line of heat elements, $h_1$ to $h_{256}$, of thermal head unit 1. By pulse width modulating the energization signals based upon the detected gray scale levels of the picture elements, the heat elements of the thermal head will be powered for a corresponding length of time to reproduce the various gray scale levels forming the television image.

Referring now to FIG. 2, a known gray scale signal generating circuit is shown in block diagram form. In FIG. 2, a sample voltage corresponding to a general picture element $d_{m,n}$, as shown in FIG. 1, is supplied to terminal 2 of analog-to-digital converter 3. The digital output signals of analog-to-digital converter 3 are stored in units of lines, corresponding to the lines in the television frame S, in random access memory (RAM) 4 at locations in accordance with address signals generated from address counter 5. The stored gray scale level signals are then sequentially read out from random access memory 4 into comparator 6, where they are compared with respective reference gray scale signals from gray scale counter 7. Thus, the output of comparator 6 represents a series of adjusted gray scale levels corresponding to the various scanned points of the image of the television screen S having been compared with reference gray scale signals. The outputs of comparator 6 are latched into positions in addressable latch 8, as determined by the output of address counter 5, which also provides the addresses that are input to random access memory 4. The output signals from addressable latch 8 are then fed to thermal head 1 as parallel signals corresponding to the number of energizable heat elements that make up thermal head 1. The various signals are clocked through the system of FIG. 2 in a synchronous fashion under control of clock signal generators 9 and 10.

In the gray scale signal generator described above in relation to FIG. 2, the picture elements in one vertical line of the television frame that are to be copied are fetched or retrieved as digital signals in accordance with an address signal from address counter 5. The digital signals are then compared in sequence with the reference gray scale level signals produced by gray scale counter 7 in comparator 6. The result of each comparison is a binary output signal, consisting of either "1" or "0", produced in accordance with the comparative intensity of the two signals being individually compared. The binary output signal from comparator 6 is fed to addressable latch 8. Because the picture element data of one vertical line of television screen S must be supplied to comparator 6 in response to each reference gray scale signal, the circuit configuration must be quite complex in order to perform this comparison, and such complexity results in a constraint on the operating speed of the system. This circuit complexity not only adversely affects system operating speed but also decreases overall circuit reliability.

OBJECTS AND SUMMARY OF THE INVENTION

Accordingly, it is an object of the present invention to provide apparatus for generating gray scale signals employing a relatively simple circuit configuration and having improved reliability.

It is another object of the present invention to provide apparatus for generating gray scale signals for producing a thermally printed image of a television signal, which does not employ any comparators in producing the level-adjusted gray scale signals.

According to one aspect of the invention, the reference gray scale and the digital data corresponding to the television frame are contained in a read only memory and are serially read out, according to an address counter, into a random access memory. The random access memory is subsequently read out into a shift register in accordance with a gray scale counter and the address counter. The shift register then provides parallel output signals to a latch circuit employing drivers suitable for energizing the heat elements of the thermal print head.

The present invention provides that the digital signal stored in the read only memory can be regarded as a pulse wave corresponding to a single dot or address in the picture signal and, thus, this signal acts as a pulse width modulated signal to control an element in the thermal printing head.

The above, and other objects, features, and advantages of the present invention, will be apparent from the following detailed description of an illustrative embodiment that is to be read in conjunction with the accompanying drawings, in which the same reference numerals identify the corresponding elements and parts in the several views.

BRIEF DESCRIPTION OF THE DRAWINGS

FIG. 5 is a graphical representation of the data produced by the read only memory of the circuit of FIG. 3.

DETAILED DESCRIPTION OF A PREFERRED EMBODIMENT

Figure 1:
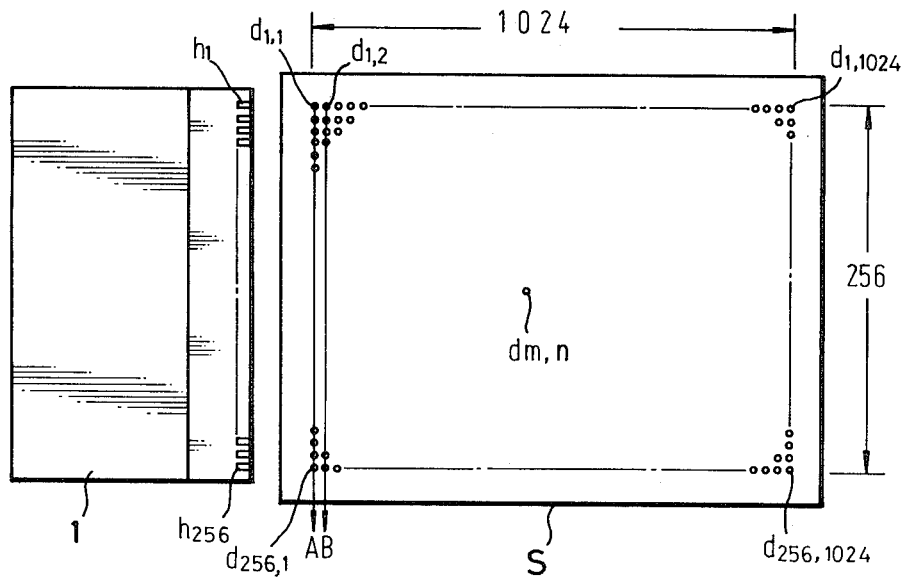
FIG. 1 is a representation of a television screen showing the location of various data points thereon.
Figure 3:
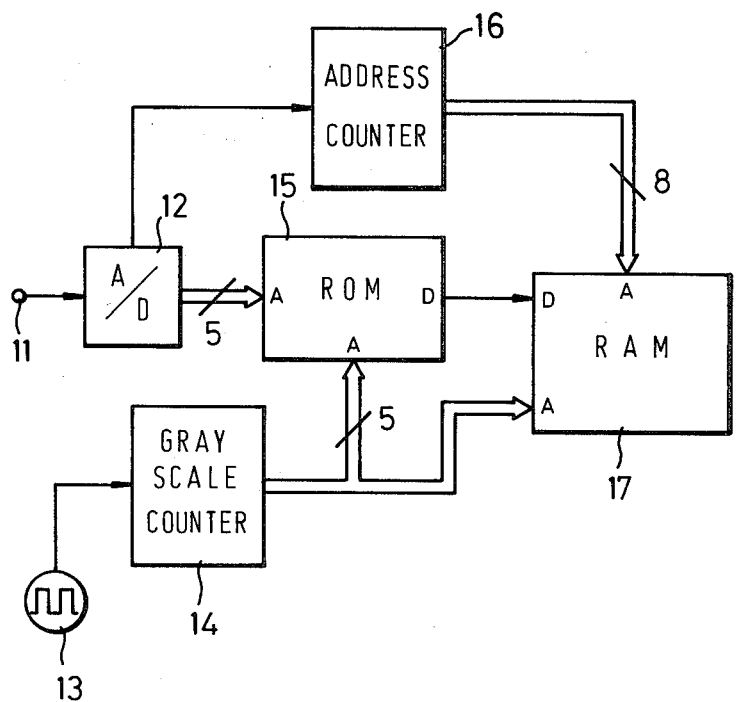
FIG. 3 is a schematic block diagram of a gray scale generating circuit according to the present invention.
Figure 4A:
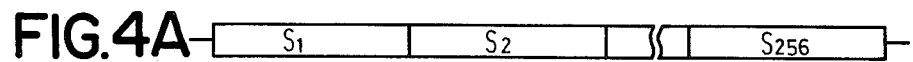
FIGS. 4a–4d represent various signals and digital words present in the circuit of FIG. 3.
Figure 4B:
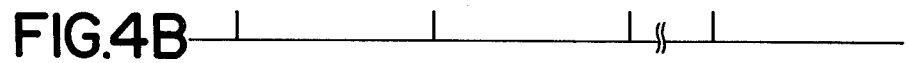

Referring to FIG. 3, an analog signal obtained by sampling each picture element of a television frame signal, as shown for example in FIG. 1, is supplied to input terminal 11 of analog-to-digital converter 12, where the analog input signal is converted into a digital signal. Clock signal generator 13 drives a reference gray scale counter 14 to form digital data corresponding to the reference gray scale levels. Read only memory 15 accepts digital input data from analog-to-digital convertor 12 in a manner that will be described hereinbelow and is addressed by the digital output signal from analog-to-digital converter 12 and also by the gray scale reference levels from gray scale counter 14. Address counter 16 is connected to analog-to-digital converter 12 and counts end-of-conversion pulses (FIG. 4B), which are produced after the output signals from the analog-to-digital converter 12. Address counter 16 employs these end-of-conversion pulses to generate an address signal to designate an address of random access memory 17. Data in read only memory 15 is then fed into random access memory 17 sequentially, in accordance with the counts of address counter 16 and the reference gray scale levels from gray scale counter 14, which is also connected to random access memory 17 for supplying the reference gray scale levels thereto.

Figure 4C:
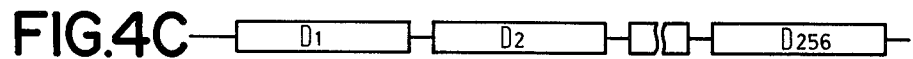
Figure 4D:
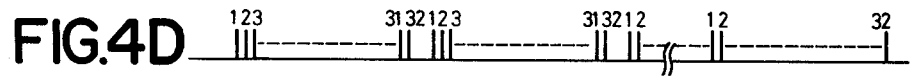

In the operation of the circuit of FIG. 3, the samples obtained by vertically sampling the picture elements of the television screen S of FIG. 1 are supplied as input voltages $S_1$ to $S_{256}$ (FIG. 4A) to analog-to-digital converter 12, for each horizontal sync period. Analog-to-digital converter 12 digitizes the voltage samples and produces digital signals as data words ($D_1$ to $D_{256}$) (FIG. 4C) to designate sequential addresses in read only memory 15. In this embodiment, a reference gray level RDn from gray scale counter 14 comprises a five-bit binary signal, which permits counts from 0 to 31. The bits of this five-bit signal are represented by A0 through A4. Similarly, in this embodiment, the digital output from analog digital converter 12 also comprises five-bit binary data Dn, with the bits of data being represented by A5 through A9. The data stored in read only memory 15, as accessed by reference gray scale levels RDn produced by reference gray scale counter 14 and by the digital input data Dn produced by analog-to-digital converter 12, is as shown in FIG. 5.

Referring to FIG. 5, a reference gray scale level RDn, as produced by gray scale counter 14, designates one of thirty-two column addresses 00H to 1FH of read only memory 15, wherein the columnar addresses are given in hexadecimal notation. Similarly, an output data point Dn from analog-to-digital converter 12 designates a row address 00H to 1FH, corresponding to one of the thirty-two rows available in read only memory 15, with the row addresses also being in hexadecimal notation. Therefore, as is conventional, one can read out data, either a 1 or a 0, at a memory location given by an intersection of a row and column in read only memory 15 by providing the appropriate two address signals.

Accordingly, when the output data point D1 from analog-to-digital converter 12 is 01H, which could also be represented as 00001 in binary notation, and the reference gray scale level RDn of gray scale counter 14 varies for thirty-two levels from 00H, to 1FH, which could be represented as 00001 to 11111 in binary notation, a thirty-two-bit signal train represented as "111 . . . 110" will be read out from read only memory 15. This output signal may be seen by reading across row 01, the second row from the top in the representation of FIG. 5. Further, when the output data point D2 from analog-to-digital converter 12 is 1AH, which corresponds to 10001 in binary notation, and the reference gray scale level RDn from the gray scale counter for thirty-two levels is again given by 00H to 1FH, a thirty-two bit signal train consisting of data points "11111000 . . . 00" will be read out from read only memory 15. Again, this thirty-two bit signal frame is seen in FIG. 5 by reading across row 1A, which is the sixth row from the bottom.

Therefore, the thirty-two bit signal read out from read only memory 15 is sequentially written at the appropriate addresses of random access memory 17, as designated by the count of address counter 16, which is counting the end of conversion pulses produced by analog-to-digital converter 12 and by the output from gray scale counter 14, in the manner described above.

If television screen S of FIG. 1 has 256 ($2^8$) sample points in one vertical line, random access memory 17 must have sufficient capacity to store data corresponding to 256 thirty-two bit words. Further, in this example, address counter 16 would be reset at each vertical sync signal, thus, signifying the end of the last of the 256 thirty-two bit words.

The data format, shown in FIG. 5, provided by the present invention indicates that the thirty-two bit signal train stored in read only memory 15 can be regarded as a pulsed wave, which corresponds to a single dot or point, wherein a signal of logic level "1" energizes the appropriate heating element of thermal print head 1 and a signal of logic level "0" de-energizes the heating element of thermal print head 1. Accordingly, upon the appropriate address signal being fed to read only memory 15, the signal that is read out is the equivalent of a pulse-width modulated signal of an output from analog to digital converter 12 and provides the gray scale level of any picture element Dmn of television picture screen S in FIG. 1.

Therefore, when a multiple-bit signal, written into random access memory 17 from read only memory 15, is read out as parallel control signals to a control circuit for a thermal printing head, which operates to print an entire vertical line of the television frame, the picture elements represented at d1 to d256 of a vertical line, as shown in FIG. 1 are printed in the form of dots each of which has an appropriate gray scale level, corresponding to that as determined during the initial scan thereof.

Figure 2:
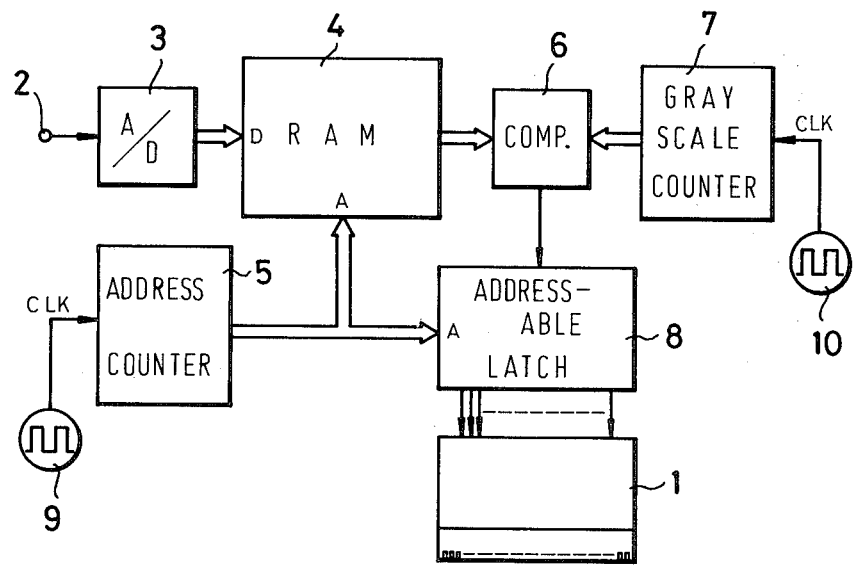
FIG. 2 is a schematic block diagram illustrating a known gray scale signal generating circuit.
Figure 6:
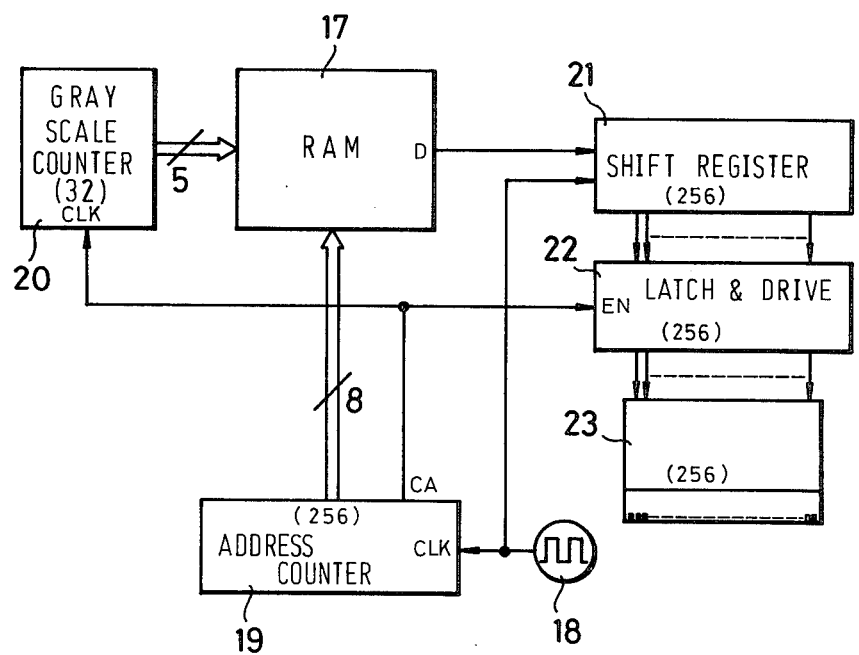
FIG. 6 is a schematic block diagram showing the inventive circuit for reading out gray scale signals from the circuit of FIG. 3.

FIG. 3 represents the random access memory 17 and the associated circuitry necessary to operate the random access memory 17 in a "read" mode, whereas FIG. 6 is a schematic block diagram of the associated circuitry necessary to operate random access memory 17 in the "write" mode. Referring then to FIG. 6, reference clock signal generator 18 provides clock pulses to address counter 19, which contains 256 addresses and provides an output connected to random access memory 17. Gray scale counter 20 contains the reference gray scale in accordance with the above, for providing address information to random access memory 17. Output data from random access memory 17 is fed to shift register 21 containing 256 data locations, and shift register 21 also receives clock pulses from clock signal generator 18. The contents of shift register 21 is shifted out on 256 lines to latch and drive circuit 22. Latch and drive circuit 22 contains suitable drivers to drive the 256 heating elements contained in thermal head 23, which corresponds to thermal head 1 of FIG. 2.

In the circuit of FIG. 6, gray scale counter 20 provides a five-line parallel output to random access memory 17 to designate one of the thirty-two addresses in random access memory 17 corresponding to addresses A0 to A4, which designate a reference gray scale, as seen in FIG. 5. The other address input to random access memory 17 is on eight lines from address counter 19 that permit selecting any one of 256 locations. Reference clock signal generator 18 feeds clock pulses to address counter 19, wherein they are counted in order to access addresses A5 to A12 to transfer the appropriate binary data from random access memory 17 to shift register 21.

For example, when the count of gray scale counter 20 is 00H, the first 256 bits of the thirty-two bit signals respectively stored in random access memory 17 are serially transferred to shift register 21, whence they are supplied as parallel signals to latch drive circuit 22 for driving thermal head 23. Similarly, when the count of gray scale counter 20 is 01H, the 256 second bits of the thirty-two bit signals contained in random access memory 17 are read out sequentially into shift register 21 for ultimate energization of the appropriate heating elements in thermal head 23. Since shift register 21 receives 256 bits of thirty-two bit signals and produces the same in the form of parallel signals to the latch and drive circuit 22 of thermal head 23, 256 dots having gray scale levels are printed by reading out all of the data stored in random access memory 17.

Thus, it may be seen that a gray scale signal generated by the circuits described above is obtained by pulse width modulating a gray scale level of a sampling point on a television frame by data stored in a read only memory, shown at 15 in FIG. 1 and described above, to a pulse width that determines an energizing duration of the signals for driving the heating elements of thermal head 23.

In another aspect of the invention, two random access memories corresponding to random access memory 17, could be utilized in a time sharing manner, so that when one random access memory was in the "reading" mode, as shown for example in FIG. 3, then the other random access memory could be in the "writing" mode, as shown for example in FIG. 6. In such a two random-access-memory system, clock signal generators 9 and 10, reference clock signal generator 18, gray scale counter 20, and the like could be utilized in a single circuit configuration.

In still another aspect of the present invention, the frequency of the reference clock signal generator 18 which drives the system in the write mode can be varied to control the strength or intensity of the resultant printed image.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention, as defined by the appended claims.

What is claimed is:

1. An apparatus for printing a gray scale image using a thermal printing head driven by digital data representing a plurality of image elements of the image to be printed, the apparatus comprising:
    reference generator means for generating digital reference gray scale level signals;
    first memory means containing known data stored therein for producing a corresponding output when addressed by said reference gray scale level signals and said digital data;
    second memory means for storing said output from said first memory means at addresses determined by signals produced by an address counter and by said reference gray scale level signals, said stored output representing pulse width modulated digital data; and
    output means connected to an output of said second memory means for supplying drive pulses to heat elements of said thermal printing head corresponding to said pulse width modulated digital data stored in said second memory means.

2. An apparatus for printing a gray scale image according to claim 1; in which said output means includes a serial-to-parallel conversion means for serially receiving data read out from said second memory means for conversion into parallel form.

3. An apparatus for printing a gray scale image according to claim 1; in which said reference generator means includes means for cyclically generating said reference gray scale level signals to circulate once in response to digital data representing each of said plurality of image elements.

4. An apparatus for producing a gray scale image according to claim 1; in which said output means includes first address generator and second address generator land said second memory means is accessed by addresses generated by said first and second address generators.

5. An apparatus for printing a gray scale image according to claim 4; in which said first address generator generates address signals corresponding to said reference gray scale level signals and said second address generator generates address signals corresponding to said digital data representing said image elements.

6. Apparatus for printing a gray scale image according to claim 1; in which said first memory means comprises a read only memory containing data arranged therein according to a known memory pattern.

7. An apparatus for printing a gray scale image according to claim 1; in which said second memory means comprises a random access memory receiving data from said first memory means and address signals from an address counter and from said reference gray scale level signal generator.

8. An apparatus for producing signals to drive a thermal printing head to reproduce a gray scale image, comprising:
    means for deriving image data signals representing gray scale levels at specific points on said image;
    means for generating reference gray scale level signals according to pre-selected gradations;
    first memory means having predetermined data stored therein at known addresses for producing an output representing said predetermined data upon receiving corresponding address signals from said means for generating reference gray scale levels and from said means for deriving image data signals;

second memory means for storing outputs from said first memory means at addresses determined to said reference gray scale signal levels and by a sequential count of said image data signals; and output means for obtaining output signals from said second memory means by addressing said second memory means with a sequential address counter and a reference gray scale counter, said output signals being fed to drive said thermal printing head.

9. Apparatus for producing signals to drive a thermal printing head according to claim 8; in which said image data signals are derived as a serial analog signal and further including means for producing parallel digital data signals therefrom, said parallel digital data signals being fed to said first memory means as address signals.

10. An apparatus for producing signals to drive a thermal printing head according to claim 8; further comprising means responsive to said image data signals for providing a cyclical count of said data fed to said first memory means, said cyclical count being used for addressing said first memory means.

11. Apparatus for producing signals to drive a thermal printing head according to claim 8; in which said output means includes shift register means receiving output signals from said second memory means for producing a plurality of parallel signals fed to a latch and driver means for driving said thermal printing head.

12. An apparatus for producing signals to drive a thermal printing head in accordance with claim 8; in which said first memory means comprises a read only memory having predetermined data arranged therein according to a known memory pattern.

13. An apparatus for producing signals to drive a thermal printing head in accordance with claim 8; in which said second memory means comprises a random access memory receiving data from said first memory means and address signals from said reference gray scale level signal generator and from an address counter producing address signals representing a sequential count of said image data signals.

14. An apparatus for producing signals to drive a thermal printing head according to claim 8; wherein said reference gray scale generator includes means for cyclically generating reference gray scale levels to circulate once in response to digital data representing each of said specific points on said image.

15. An apparatus for producing signals to drive a thermal printing head according to claim 8; in which said output means includes first and second address generator means and said second memory means is accessed by address data generated by said first and second address generators.

16. An apparatus for producing signals to drive a thermal printing head according to claim 15; in which said first address generator generates address signals corresponding to said reference gray scale level signals and said second address generator generates address signals corresponding to said image data signals.

* * * * *